Inventor
PAUL P. BEACH
By Robert U. Geib, Jr.

Patented Apr. 24, 1951

2,550,215

UNITED STATES PATENT OFFICE 2,550,215

POULTRY FEEDER

Paul P. Beach, Berwyn, Md.; Charlotte Craig, administratrix c. t. a. of said Paul P. Beach, deceased, assignor of one-third to Courtney W. Geib, Bergen County, N. J., and one-third to Robert U. Geib, Jr., Fairfax County, Va.

Application January 26, 1948, Serial No. 4,310

1 Claim. (Cl. 119—61)

This invention relates to poultry feeders.

I am aware of a very large number of designs of poultry feeders which are at the present time being manufactured and sold, and also of a large number of patented structures which seek to improve results which were theretofore obtained. But, so far as I am aware, every one of these devices is characterized by one or more objectionable features, such as inherent lack of appeal to the poultry, costliness, lack of durability, and susceptibility to the poultry being able to throw the feed therefrom with their heads and/or feet.

It is among the objects of the present invention to provide an improved feeder which possesses unusual appeal to poultry, and one which is at the same time lightweight, easily carried, durable, and simple and inexpensive to manufacture.

I have discovered that, by providing a simple trough-like receptacle which is elevated but slightly from the ground and provided with a pair of horizonal flanges extending inwardly from the upper edges thereof, results of greatly superior magnitude may be obtained over anything heretofore known to me, provided these flanges are constructed and arranged in a manner which will be described hereinafter. One of these results is a tremendous appeal to the inherently curious nature of a chicken, prompting it to dig back under the opposed horizontal flanges referred to, while the flanges themselves are insufficient in width to enable the chicken to comfortably stand thereon while eating the feed within the trough: at the same time, the spacing between the opposed horizontal flanges being insufficient in width to permit the chicken to stand inside the trough and with its head and/or feet throw the feed therefrom in the manner which is so characteristic of the many devices of the prior art.

The invention, then, comprises the features hereinafter fully described and as particularly pointed out in the claims, the following description and the annexed drawings setting forth in detail certain illustrative embodiments of the invention.

Referring more particularly to the drawings, the feeder of the present invention is shown as comprising in substance a trough 2 which is substantially semi-cylindrical in cross section, and which is provided at either end with an end piece 3 which serves as a standard or foot portion for supporting the trough slightly above the ground.

Figure 1:
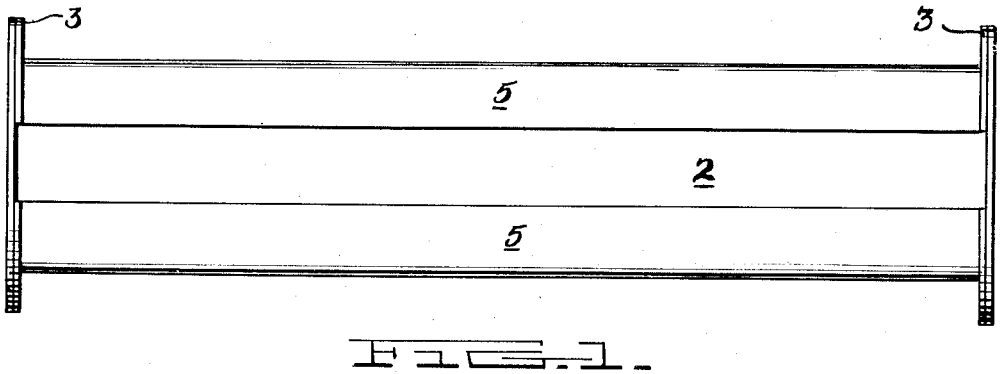
Figure 1 is a plan of the improved feeder of the present invention.
Figure 2:
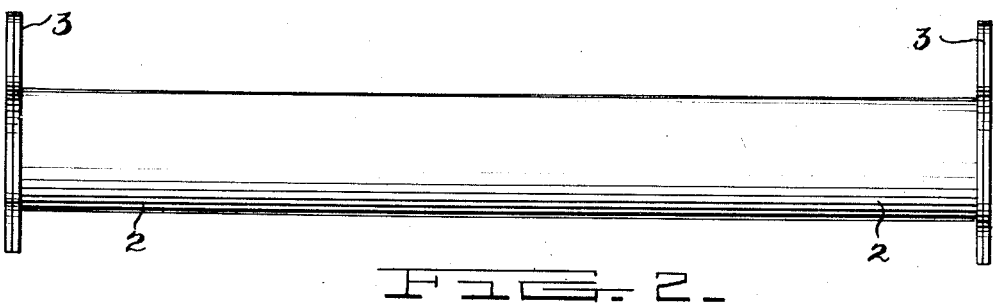
Figure 2 is a side elevation.
Figure 3:
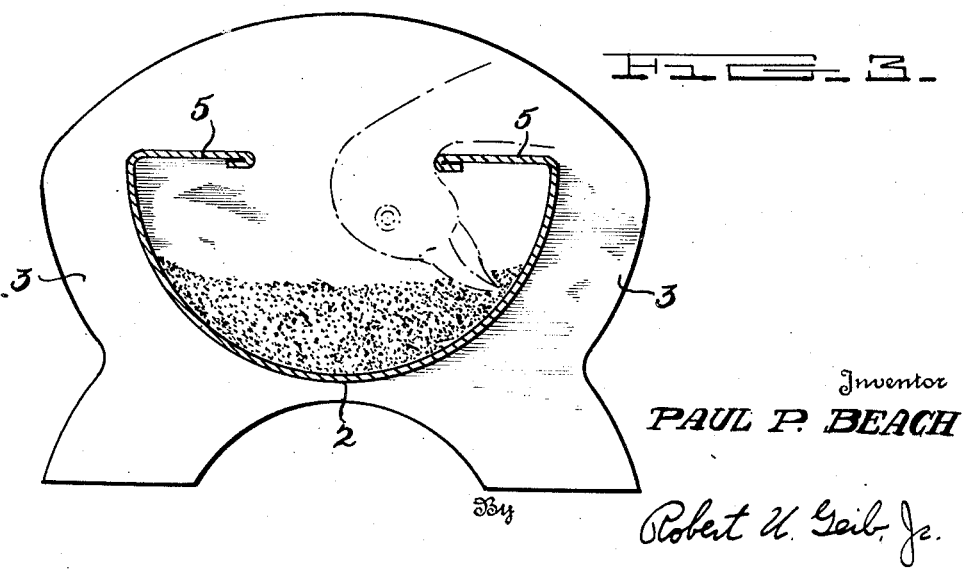
Figure 3 is a transverse sectional elevation on an enlarged scale.

As shown most clearly in Figures 1 and 2, the open ends of the semi-cylindrical trough 2 are provided with a pair of horizontally extending and opposed flanges 5 which are continuous throughout the length of the trough 2; and which I have discovered must be of a width of no less than 1¼ inches and no more than 2½ inches if the results of the invention are to be obtained. I have also discovered that to attain the objectives of the present invention the space between the adjacent and opposed edges of the flanges 5 must be no less than 1¾ inches and no more than 2¼ inches. When using dimensions within the ranges referred to immediately hereinbefore, it will be found that two sizes of feeder may be practicably utilized; one for the small chickens (i. e. under six weeks) and one for the larger, in either case the dimensions being such that the chicken, either large or small, will be very eager to reach back under the opposed horizontal flanges 5 and attempt to pick the feed from thereunder. At the same time, there is permitted substantial head space between the opposed horizontal flanges 5 which will in fact just about permit of the feeding of two chickens standing immediately opposite, but the space between the opposed horizontal flanges is insufficient to permit the chickens, whether large or small, to stand in the trough or on the flanges 5.

It will also be observed that, when using a feeder within the specific dimensions set forth herein, chickens will leave other feeders to go to it for the reason that its curiosity is greatly aroused by its inability to see immediately below the flanges 5. The net result is that there may be obtained by the use of very simple and inexpensive elements, which may be readily assembled and carried about, a feeder which is very appealing to poultry, durable, and extremely economical in that the feed is conserved within the trough to a remarkably high degree.

While I have shown and described certain specific embodiments of the present invention, it will be readily understood by those skilled in the art that I do not wish to be limited exactly thereto, since various modifications may be made without departing from the scope of the invention as defined in the appended claim.

I claim:

A poultry feeder comprising a trough-like receptacle provided with end closures and means for supporting it above the ground, and a pair of horizontal flanges extending inwardly from the upper edges of said trough in opposed relationship, said flanges being of a width which is no less than 1¼ inches and no more than 2½ inches, the space between the adjacent and opposed edges of said flanges being no less than 1¾ inches and no more than 2¼ inches.

PAUL P. BEACH.

REFERENCES CITED

The following references are of record in the file of this patent:

UNITED STATES PATENTS

| Number | Name | Date |
| --- | --- | --- |
| 1,644,263 | Moellring | Oct. 4, 1927 |
| 1,799,946 | Behler | Apr. 7, 1931 |
| 1,896,096 | Parker | Feb. 7, 1933 |